(12) United States Patent
Urano et al.

(10) Patent No.: US 7,666,547 B2
(45) Date of Patent: Feb. 23, 2010

(54) SEALED PRISMATIC BATTERY

(75) Inventors: Kazuaki Urano, Ibaraki (JP); Osamu Watanabe, Ibaraki (JP); Yoshiki Somatomo, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 409 days.

(21) Appl. No.: 11/237,764

(22) Filed: Sep. 29, 2005

(65) Prior Publication Data
US 2006/0073382 A1 Apr. 6, 2006

(30) Foreign Application Priority Data
Sep. 29, 2004 (JP) ............................. 2004-284248

(51) Int. Cl.
*H01M 2/26* (2006.01)
(52) U.S. Cl. ........................ 429/161; 429/181; 429/174; 429/122; 429/130
(58) Field of Classification Search ................. 429/122, 429/130, 161, 181, 174
See application file for complete search history.

(56) References Cited
FOREIGN PATENT DOCUMENTS

| | | | |
|---|---|---|---|
| JP | 6-163079 A | 6/1994 | |
| JP | 6-203817 A | 7/1994 | |
| JP | 11-25993 A | 1/1999 | |
| JP | 2003-242957 A | 8/2003 | |
| JP | 2004-14395 A | 1/2004 | |

*Primary Examiner*—Jane Rhee
(74) *Attorney, Agent, or Firm*—Birch, Stewart, Kolasch & Birch, LLP.

(57) ABSTRACT

A lid 3 that closes the upper surface of the opening of a closed-bottom prismatic tubular battery can 1, an electrode body 2 accommodated in the battery can 1, a negative terminal 12 penetratively fastened to the lid 3, an insulating plate 11 placed on the lower surface side of the lid 3, a lead plate 17 placed on the lower surface side of the insulating plate 11, and a negative electrode current collector lead 7 led upwardly of the electrode body 2 are included. The upper end portion of the current collector lead 7 is welded to the lower surface of the lead plate 17 and bent in a position located rather closer to the front wall of the battery can 1. The insulating plate 11 has a lid side insulating portion 22 held between the lid 3 and the lead plate 17 and a front sidewall 25 that extends downwardly from the front end side of the lid side insulating portion 22. In a free state before the battery is assembled, the lid side insulating portion 22 and the sidewall 25 of the insulating plate 11 extend roughly straightly.

1 Claim, 8 Drawing Sheets

SEALED PRISMATIC BATTERY

BACKGROUND OF THE INVENTION

The present invention relates to a sealed prismatic battery whose output terminal is penetratively fastened to its lid that closes the battery can opening and in which the current collector lead led from the electrode body is connected to the lower end of the output terminal via a lead plate.

JP 2004-14395 A discloses a sealed prismatic battery including a lid that closes the upper surface of the opening of a battery can having a closed-bottom prismatic tubular shape and a negative terminal penetratively fastened to the lid. The negative terminal is fastened to the lid via insulative packing and an insulator arranged on the upper and lower sides of the lid. A lead plate is connected to the lower end of the negative terminal, and a negative electrode current collector lead led from the electrode body in the battery can is welded to the lower surface of the lead plate.

In assembling the battery, the negative terminal, the insulative packing, the insulator and the lead plate are preparatorily fastened to the lid. Then, after the upper end portion of the negative electrode current collector lead is welded to the led plate in a state in which the electrode body is accommodated in the battery can, the lid is fit into the upper surface of the opening of the battery can, and the outer peripheral edges of the lid are seam welded to the peripheral edges of the opening of the battery can.

When the lid is fit into the upper surface of the opening of the battery can after the negative electrode current collector lead is welded to the lead plate, the negative electrode current collector lead is accommodated in a bent state in the battery can. Therefore, the negative electrode current collector lead is easily brought in contact with the inner surface of the battery can by the bending, and it is concerned that the negative electrode current collector lead is short-circuited with the battery can.

According to JP 2004-14395 A, a side of the negative electrode current collector lead is covered with the sidewall of an insulator having a bracket-like cross section shape, by which the negative electrode current collector lead is prevented from coming into contact with the inner surface of the battery can. However, according to JP 2004-14395 A, the lead plate is also covered with the sidewall of an insulator, and the sidewall of the insulator becomes obstructive, making it difficult to weld the negative electrode current collector lead to the lead plate.

In this case, as shown in FIG. 2 of JP H11-25993 A, it is acceptable to form a frame-shaped spacer separately from the lid, previously accommodate the spacer in the battery can and accommodate the negative electrode current collector lead in the spacer after the negative electrode current collector lead is welded to the lead plate. However, there is a problem that the negative electrode current collector lead is pinched between the upper end of the spacer and the lid in fitting the lid into the battery can, possibly causing a short circuit between the negative electrode current collector lead and the lid.

SUMMARY OF THE INVENTION

An object of the present invention is to provide a sealed prismatic battery capable of easily welding the current collector lead to the lead plate while preventing the current collector lead from being short-circuited with the lid or the sidewall of the battery can.

As shown in FIG. 3, the sealed prismatic battery of the present invention includes a battery can 1 of a closed-bottom prismatic tubular shape that has an opening at its upper surface, a lid 3 that closes the upper surface of the opening of the battery can 1, an electrode body 2 accommodated in the battery can 1, an output terminal 12 penetratively fastened to the lid 3, an insulator 11 that is placed on the lower surface side of the lid 3 and insulates the output terminal 12 at least from the lower surface of the lid 3, a plate-shaped lead plate 17 that is placed on the lower surface side of the insulator 11 and connected to the lower end of the output terminal 12, and a thin-plate-shaped current collector lead 7 led upwardly of the electrode body 2. As shown in FIG. 1, the upper end portion of the current collector lead 7 is welded to the lower surface of the lead plate 17 in a surface contact state, and the current collector lead 7 is bent at least in a position located rather closer to the front wall of the battery can 1. In this case, the output terminal 12 includes the case of a negative terminal and the case of a positive terminal, and the current collector lead 7 accordingly includes the case of a negative electrode current collector lead and the case of a positive electrode current collector lead.

In the sealed prismatic battery, according to a first aspect of the present invention, the insulator 11 has a lid side insulating portion 22 held between the lid 3 and the lead plate 17 and a sidewall 25 that extends downwardly at least from the front end side of the front and rear ends of the lid side insulating portion 22, and the lid side insulating portion 22 and the sidewall 25 of the insulator 11 straightly extend in a free state before the battery is assembled. There are included the case where the sidewalls 25 and 26 are provided at the front and the rear as shown in FIG. 1 and the case where only the front sidewall 25 is provided as shown in FIG. 6. The lid side insulating portion 22 and the sidewall 25 are only required to extend roughly straightly in the free state, and a case where the lid side insulating portion 22 and the sidewall 25 are connected together in a flat plate shape without any boundary such as a groove is also included.

The insulator 11 should preferably have a groove 23 or a thin film portion for downward bending at the boundary between the lid side insulating portion 22 and the sidewalls 25 and 26. In this case, the insulator 11 can easily be bent in the manufacturing stage of the battery.

As shown in FIGS. 1 and 6, an insulating plate 5 made of a material having a high rigidity should preferably be placed above the electrode body. The insulating plate 5 is only required to be made of a resin having a flexibility and should desirably be made of polypropylene or polyethylene although not specifically limited. The thickness dimension should desirably be 0.2 to 0.5 mm and more desirably be 0.2 to 0.4 mm. The current collector lead 7 can be led to the lead plate 17 through a through hole 20 provided at the insulating plate 5. The through hole 20 of the insulating plate 5 includes one that is penetratively formed at the insulating plate 5 and one that is obtained by partially cutting away the insulating plate 5.

According to a second aspect of the present invention, as shown in FIGS. 7, 8 and 9, the insulator 11 includes a lid side insulating portion 22 held between the lid 3 and the lead plate 17, a sidewall 25 that downwardly extends at least from the front end side of the front and rear ends of the lid side insulating portion 22, and the electrode side insulating portion 27 that extends from the lower end of the sidewall 25 toward the center in the front-and-back direction of the battery. In a free state before the battery is assembled, the lid side insulating portion 22 and the sidewall 25 of the insulator 11 straightly extend. In this case, the insulator 11 includes the case where only the front sidewall 25 is provided as shown in FIGS. 7 and 8 and the case where the sidewalls 25 and 26 are provided at the front and the rear as shown in FIG. 9. Moreover, a case where the lid side insulating portion 22 and the sidewall 25 extend roughly straightly is also included.

According to a third aspect of the present invention, as shown in FIGS. 10 and 12, the insulator 11 includes a lid side insulating portion 22 held between the lid 3 and the lead plate 17, an electrode side insulating portion 29 placed on the upper side of the electrode body 2, and a thin plate portion 30 that has a flexibility and connects the lid side insulating portion 22 with the electrode side insulating portion 29. The thin plate portion 30 of the insulator 11 is positioned closer to the front wall of the battery can 1 than the current collector lead 7, and a projection 32 that upwardly projects is provided on the upper surface of the electrode side insulating portion 29.

When the lower portion of the current collector lead 7 is covered with the insulating member 9, the current collector lead 7 is not short-circuited with the battery can 1 even if the upper portion of the current collector lead 7 bends at a position located rather closer to the front wall of the battery can 1 and the lower portion of the current collector lead 7 comes into contact with the inner surface of the rear wall of the battery can 1. In this case, the rear wall 26 of the insulator 11 can be removed. The insulating member 9 may be constructed of an insulating tape, an insulating paint or the like.

According to the first aspect of the present invention, the bent current collector lead 7 can be prevented from coming into contact with the inner surface of the battery can 1 by virtue of the sidewalls 25 and 26 of the insulator 11. In the free state before the battery is assembled, the lid side insulating portion 22 and the sidewalls 25 and 26 of the insulator 11 extend roughly straightly. Therefore, the sidewalls 25 and 26 of the insulator 11 do not become obstructive in welding the current collector lead 7 to the lower surface of lead plate 17, and the workability of the welding is improved.

When the insulating plate 5 made of a material of a high rigidity is placed on the upper side of the electrode body 2, if the battery suffers an impact in the longitudinal direction due to the drop of the battery, the upper surface of the electrode body 2 can be prevented from becoming dented or deformed due to the impact of the drop is by receiving the impact by the insulating plate 5. Therefore, the positive pole and the negative pole are prevented from becoming short-circuited with each other as a consequence of the deformation of the electrode body 2 due to the impact of the drop or the like. Moreover, the insulating plate 5 can be reduced in thickness by the high rigidity owned by the insulating plate 5, and the battery capacity can be increased by enlarging the electrode body 2.

According to the second aspect of the present invention, the bent current collector lead 7 can be prevented from coming into contact with the inner surface of the battery can 1 by virtue of the sidewalls 25 and 26 of the insulator 11. In the free state before the battery is assembled, the lid side insulating portion 22 and the sidewalls 25 and 26 of the insulator 11 extend roughly straightly. Therefore, in welding the current collector lead 7 to the lower surface of the lead plate 17, a distance from the welding portion to the electrode side insulating portion 27 can be increased, and the electrode side insulating portion 27 becomes less obstructive to the welding. Therefore, the workability of the welding can be improved. Moreover, the electrode body 2 is pushed by the electrode side insulating portion 27 of the insulator 11, and this reduces the possible occurrence of the shaking of the electrode body 2 in the battery can 1 and the dent or deformation of the upper surface of the electrode body 2 due to the impact of the drop. Since no insulating plate 5 of a separate member is needed for the effect, component management and so on can be reduced.

According to the third aspect of the present invention, the thin plate portion 30 of the insulator 11 is located closer to the front wall of the battery can 1 than the current collector lead 7, by which the bent current collector lead 7 is prevented from coming into contact with the front wall inner surface of the battery can 1 in the position located rather closer to the battery can 1.

By making the thin plate portion 30 of the insulator 11 extend roughly straightly in the free state before the battery is assembled, the lid side insulating portion 22 and the electrode side insulating portion 29 extend roughly straightly. Therefore, neither the thin plate portion 30 nor the electrode side insulating portion 29 becomes obstructive in welding the current collector lead 7 to the lower surface of the lead plate 17, and the workability of the welding is improved. Moreover, the electrode body 2 is pushed by the electrode side insulating portion 29 of the insulating plate 11, and this reduces the possible occurrence of the shaking of the electrode body 2 in the battery can 1 and the dent or deformation of the upper surface of the electrode body 2 due to the impact of the drop. Since no insulating plate 5 of a separate member is needed for the effect, the component management and so on can be reduced.

Furthermore, a space can reliably be secured between the electrode side insulating portion 29 of the insulator 11 and the lead plate 17 by the projection 32. By accommodating the current collector lead 7 in the space, the current collector lead 7 can be prevented from being broken as a consequence of its being tightly pinched between the lead plate 17 and the electrode side insulating portion 29.

When the lower portion of the current collector lead 7 is covered with the insulating member 9, the current collector lead 7 is not short-circuited with the battery can 1 even if the upper portion of the current collector lead 7 is bent at the position located rather closer to the front wall of the battery can 1 and the lower portion of the current collector lead 7 comes into contact with the rear wall inner surface of the battery can 1. Therefore, the rear wall 26 of the insulator 11 can be removed.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

First Embodiment

Figure 1:
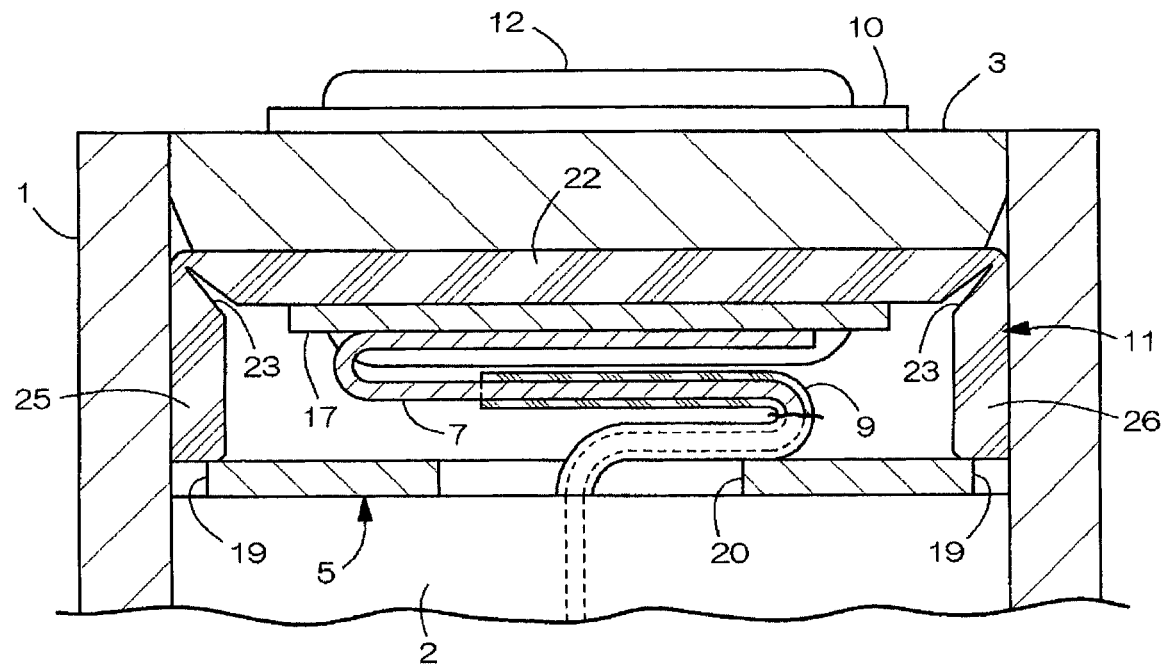
FIG. 1 is a sectional view taken along the line A-A of FIG. 2.
Figure 2:
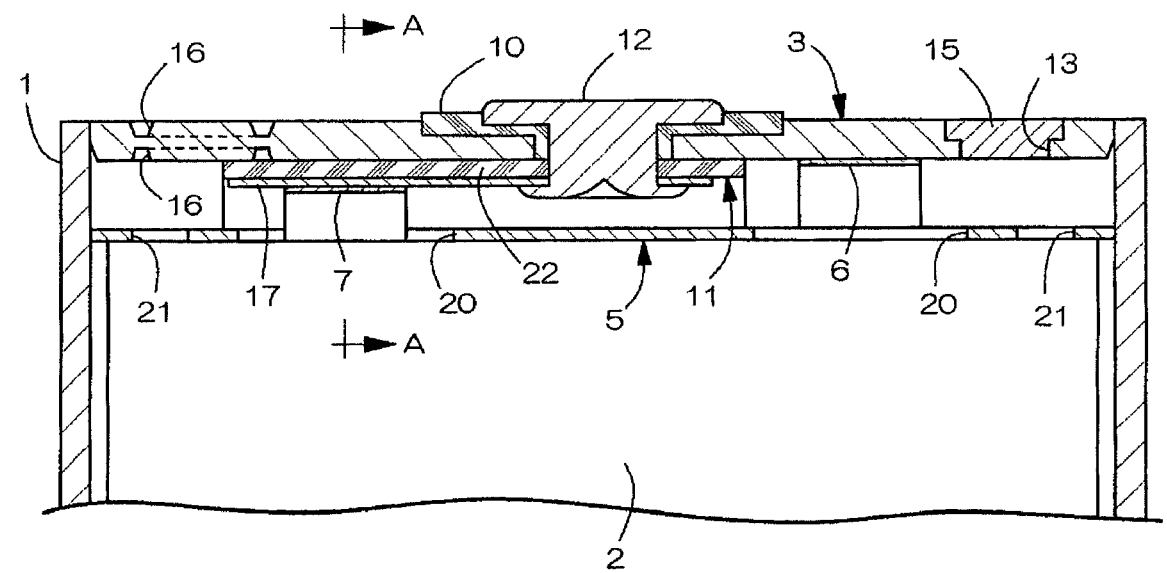
FIG. 2 is a longitudinal sectional front view of the sealed prismatic battery of a first embodiment.
Figure 3:
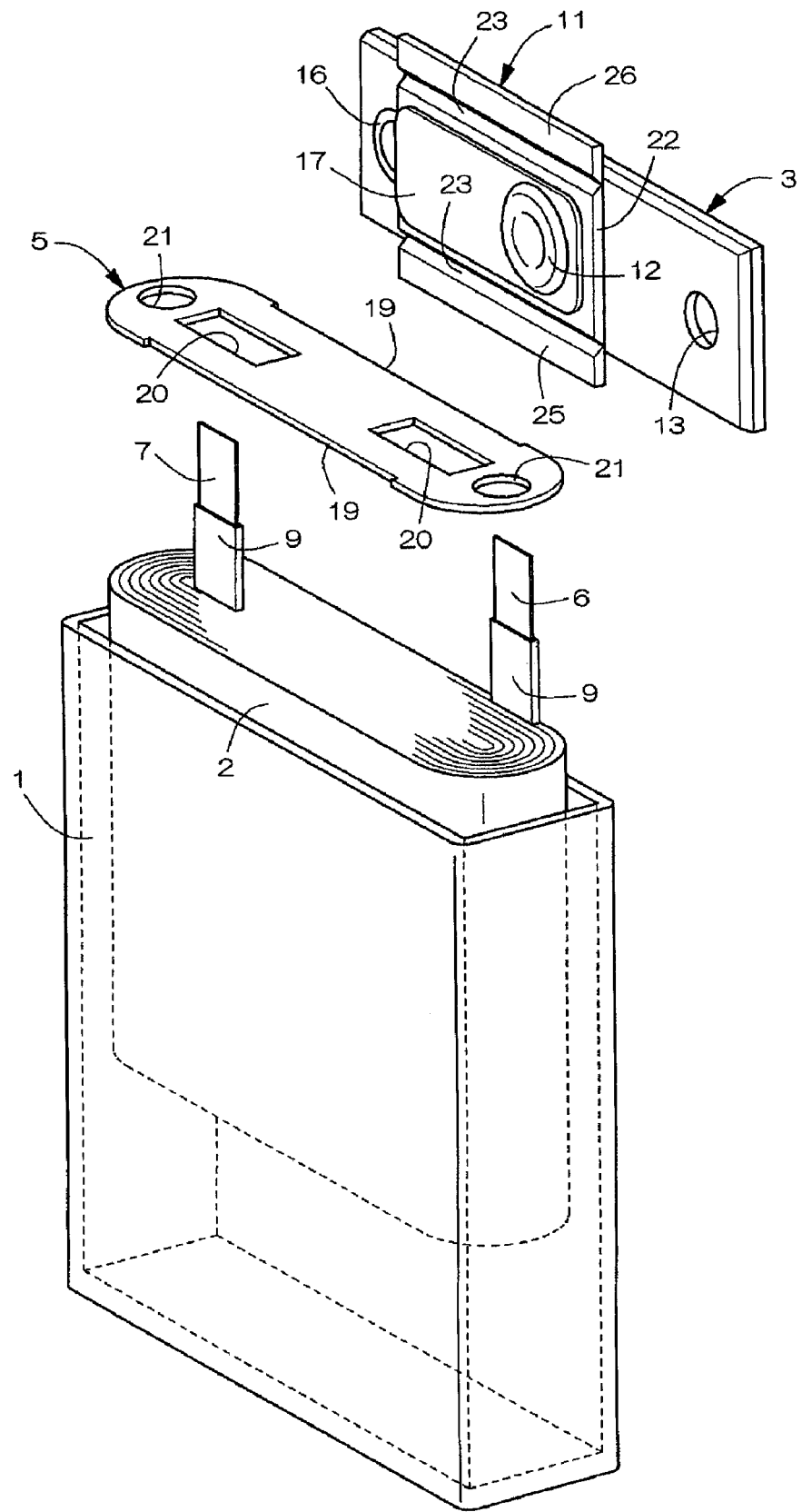
FIG. 3 is an exploded perspective view of the sealed prismatic battery of the first embodiment.

FIGS. 1 through 5 show the first embodiment of a lithium ion secondary battery as the sealed prismatic battery of the present invention. As shown in FIG. 3, the lithium ion secondary battery has a closed-bottom prismatic tubular battery can 1 that has a laterally elongated opening at its upper surface, an electrode body 2 and a nonaqueous electrolyte accommodated in the battery can 1, a laterally elongated lid 3 that closes the upper surface of the opening of the battery can 1, a thin-plate-shaped insulating plate 5 placed on the upper side of the electrode body 2 and so on. The battery can 1 is formed into a longitudinally elongated thin configuration by deep drawing a plate material made of aluminum or its alloy and has a widthwise dimension of 34 mm, a heightwise dimension of 50 mm and a front-and-back thicknesswise dimension of 4 mm.

The electrode body 2 is obtained by winding each sheet-shaped positive pole and negative pole in a roll form with interposition of a separator constructed of a microporous polyethylene film. A thin-plate-shaped positive electrode current collector lead 6 made of aluminum or an aluminum alloy is upwardly led from the positive pole electrode. A thin-plate-shaped negative electrode current collector lead 7 made of nickel, copper or a composite material of these is upwardly led from the negative pole electrode. The positive electrode current collector lead 6 is arranged on the outer peripheral side in the winding direction of the electrode body 2, and a lower portion of the lead portion of the positive electrode current collector lead 6 is covered with an insulating tape 9. The negative electrode current collector lead 7 is arranged on the inner peripheral side of the winding direction of the electrode body 2, and a lower portion of the lead portion of the negative electrode current collector lead 7 is covered with an insulating tape (insulating member) 9.

The lid 3 is obtained by press-forming a plate material of an aluminum alloy or the like, and the outer peripheral edges of the lid 3 are seam welded by laser to the peripheral edges of the opening of the battery can 1. As shown in FIG. 2, a negative terminal (output terminal) 12 is penetratively fastened in the center of the lid 3 via an insulative packing 10 arranged on the upper surface side of the lid 3 and an insulator 11 arranged on the lower surface side of the lid 3. A liquid injection inlet 13 for injecting an electrolyte into the battery can 1 is formed penetratively in a position located rather closer to one end (right side in FIG. 2) in the widthwise direction of the lid 3.

The liquid injection inlet 13 is closed by being plugged with a plug 15 after the injection of the electrolyte into the battery can 1. Another groove 16 for explosion proofing is separately formed at the lid 3. When explosion proofing is assured by providing a groove for explosion proofing at the battery can 1, partially weakening the strength of seam welding between the battery can 1 and the lid 3 or taking similar measures, the groove 16 for explosion proofing is not required to be formed at the lid 3.

A laterally elongated thin-plate-shaped lead plate 17 is placed on the lower surface side of the insulating plate 11. The lead plate 17 extends from the center of the lid 3 toward the side opposite from the liquid injection inlet 13 and is connected and fixed to the lower end of the negative terminal 12 by riveting the negative terminal 12. An exposed portion of the upper end portion of the negative electrode current collector lead 7 is laser welded to the lower surface of the lead plate 17. It is acceptable to extend the lead plate 17 toward the liquid injection inlet 13 side within a range in which the plate does not overlap the lower surface of the liquid injection inlet 13.

Figure 4:
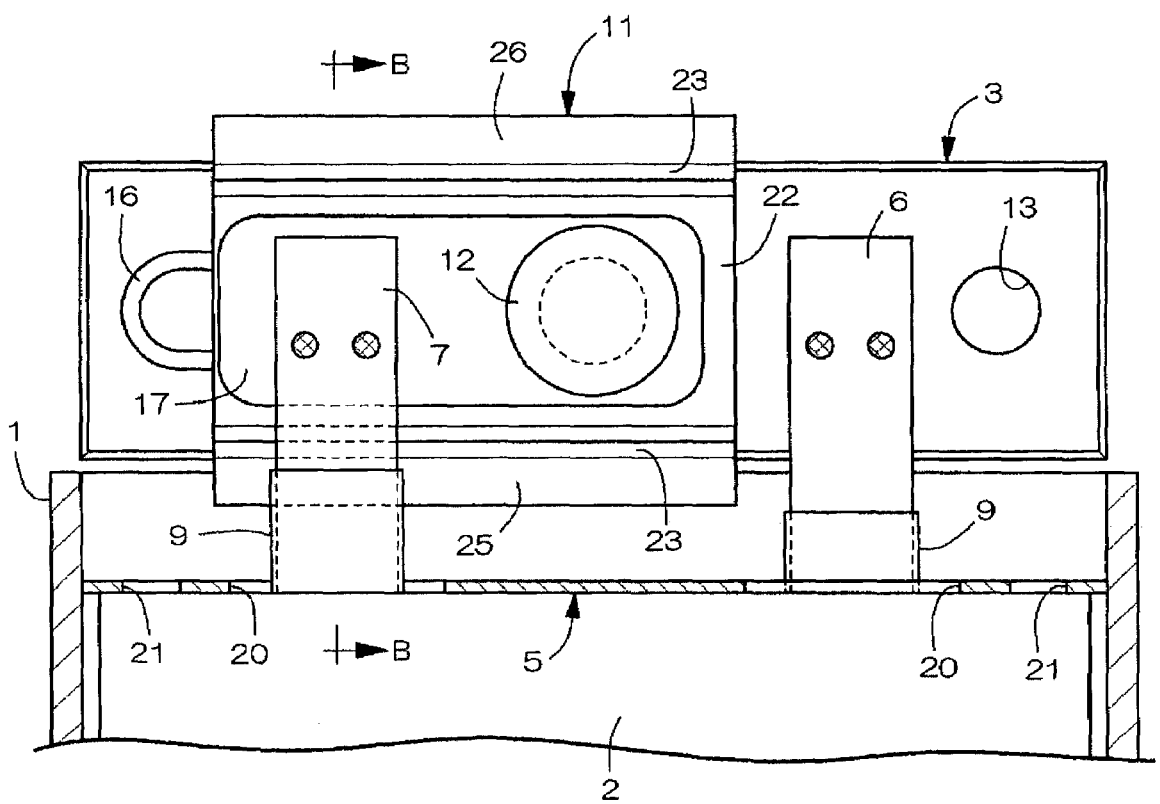
FIG. 4 is a longitudinal sectional front view showing an assembling stage of the sealed prismatic battery of the first embodiment.

An exposed portion of the upper end portion of the positive electrode current collector lead 6 is laser welded to a space located between the insulating plate 11 and the liquid injection inlet 13 on the back surface of the lid 3 as shown in FIG. 4. With this arrangement, the positive electrode current collector lead 6 is electrically continued to the lid 3 and the battery can 1, so that the lid 3 and the battery can 1 are electrically charged with the positive pole potential. By welding a clad member made of aluminum and nickel to arbitrary positions of the lid 3 and the battery can 1, a positive terminal portion can be formed (not shown). It is noted that the positive electrode current collector lead 6 and the negative electrode current collector lead 7 are connected to the lid 3 and the lead plate 17, respectively, by laser welding respectively at two or more points.

The insulating plate 5 is formed of a material of a thermo-setting resin such as phenol resin, ceramic or the like of a thickness dimension of about 0.2 to 0.3 mm and has a high rigidity. The bending strength of the insulating plate 5 should desirably be not smaller than 200 MPa and more desirably be not smaller than 250 MPa by a measurement method conforming to JIS R1601. As shown in FIGS. 1 and 2, the insulating plate 5 is laterally elongated facing almost the entire region of the upper surface of the electrode body 2.

As shown in FIG. 3, laterally elongated cut portions 19 and 19 are formed at the front and rear outer peripheral edges, of the insulating plate 5, and the positive electrode current collector lead 6 is led upwardly of the insulating plate 5 through either one of the cut portions 19. Laterally elongated through holes 20 and 20 are formed at the right and the left of the insulating plate 5, and the negative electrode current collector lead 7 is led upwardly of the insulating plate 5 through either one of the through holes 20.

That is, the insulating plate 5 is front-and-back symmetric and bilaterally symmetric, so that the positive and negative electrode current collector leads 6 and 7 can securely be put through the cut portion 19 and the through hole 20 even if the plate is reversed laterally or vertically inverted. This arrangement allows the insulating plate 5 to be fit into the battery can 1 without coordination of the lateral direction or the inversion, and the labor of the assembling work of the battery is reduced by this much.

Circular communication holes 21 and 21 are provided respectively at both right and left ends of the insulating plate 5. A reduction in the injection efficiency of the electrolyte is alleviated by the flow of the electrolyte injected from the liquid injection inlet 13 into the lower side of the battery can 1 through the communication holes 21 and 21 by virtue of the provision of the insulating plate 5. The insulating plate 5 has right and left outer peripheral edges configured into arc shapes so as to be able to cope also with a battery of which the right and left shorter side portions are configured into arc shapes.

The insulator 11 is made of a synthetic resin such as polypropylene resin having a flexibility and includes a plate-shaped lid side insulating portion 22 held between the lid 3 and the lead plate 17, a plate-shaped front wall 25 continued to the front end of the lid side insulating portion 22, and a plate-shaped rear wall 26 continued to the rear end of the lid side insulating portion 22. V-figured grooves 23 for downwardly bending the front and rear sidewalls 25 and 26 are provided at the boundaries between the lid side insulating portion 22 and the front and rear sidewalls 25 and 26.

Figure 5:
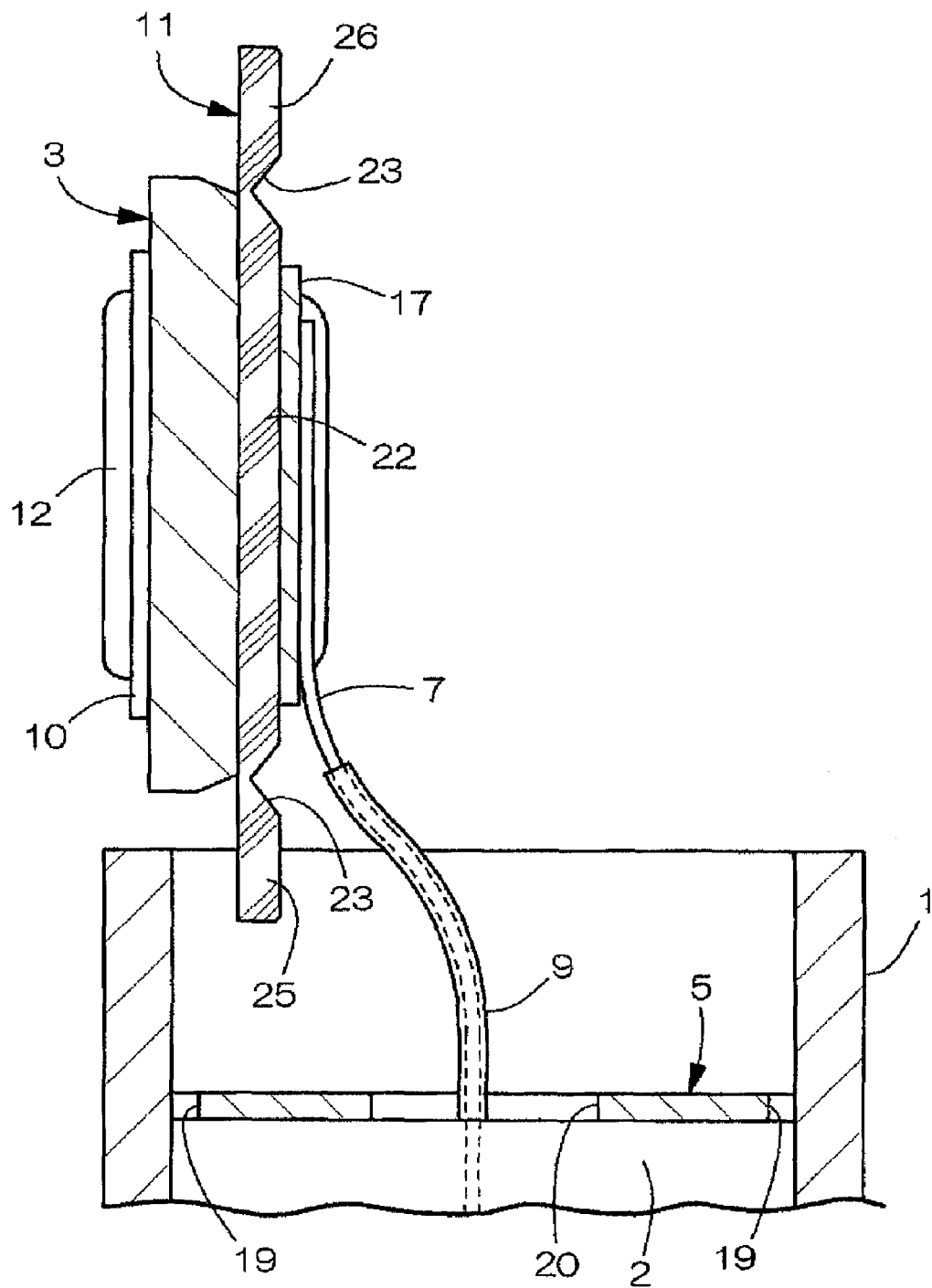
FIG. 5 is a sectional view taken along the line B-B of FIG. 4.

With regard to the insulator 11, as shown in FIG. 5, the lid side insulating portion 22 and the front and rear sidewalls 25 and 26 extend roughly straightly in a free state before the battery is assembled. Then, as shown in FIG. 1, the insulating plate 11 is fit into the opening of the battery can 1 in a state in which the front and rear sidewalls 25 and 26 are bent downwardly at the grooves 23 and 23. In this state, the front and rear sidewalls 25 and 26 extend downwardly from the front and rear ends of the lid side insulating portion 22. The insulator 11 has a thickness dimension of about 0.4 mm. The insulator 11 is laterally longer than the lead plate 17 and has a lateral dimension set so that it scarcely overlaps the groove 16 for explosion proofing.

The electrode body 2 is manufactured as follows. As shown in FIG. 3, the lower end basal portion of the negative electrode current collector lead 7 is welded to a position that becomes the inner peripheral side in the winding direction of the negative pole, and the lower end basal portion of the positive electrode current collector lead 6 is welded to a position that becomes the outer peripheral side in the winding direction of the positive pole. Next, the positive pole and the negative pole are wound in a sectionally oblong shape in conformity to the shape of the battery can 1 with interposition of a separator between these poles and thereafter fastened with a tape. Moreover, the lower portions of the lead portions of the positive and negative current collector leads 6 and 7 are each covered with the insulating tape 9.

In assembling the sealed type battery, the negative terminal 12, the insulative packing 10, the insulator 11 and the lead plate 17 are preparatorily fastened to the lid 3. Then, the positive electrode current collector lead 6 is led upwardly of the insulating plate 5 through the cut portion 19 of the insulating plate 5, the negative electrode current collector lead 7 is led upwardly of the insulating plate 5 through the through hole 20 of the insulating plate 5, and then the electrode body 2 and the insulating plate 5 are accommodated into the battery can 1.

Next, as shown in FIG. 4, an exposed portion at the upper end portion of the negative electrode current collector lead 7 is led and laser welded to the lead plate 17, and an exposed portion at the upper end portion of the positive electrode current collector lead 6 is laser welded to the lid 3 between the insulator 11 and the liquid injection inlet 13. Subsequently, the front and rear sidewalls 25 and 26 of the insulator 11 are bent at the respective grooves 23 and 23 and fit into the upper surface of the opening of the battery can 1. At this point, the positive and negative current collector leads 6 and 7 are accommodated in the battery can 1 in a state in which the leads are bent forward and backward as shown in FIG. 1. Next, the outer peripheral edges of the lid 3 are seam welded to the peripheral edges of the opening of the battery can 1, the electrolyte is injected from the liquid injection inlet 13, and thereafter, the liquid injection inlet 13 is finally closed by being plugged with the plug 15 (state of FIG. 2).

As described above, in welding the negative electrode current collector lead 7 to the lead plate 17, the lid side insulating portion 22 and the front and rear sidewalls 25 and 26 of the insulator 11 extend roughly straightly as shown in FIG. 5. Therefore, the front and rear sidewalls 25 and 26 do not become obstructive during the welding.

The insulating plate 11 and the negative electrode current collector lead 7 are fit into the battery can 1 together with the lid 3 in a state in which the negative electrode current collector lead 7 is covered with the lid side insulating portion 22 and the front and rear sidewalls 25 and 26 of insulating plate 11. Therefore, as shown in FIG. 1, the bent upper portion of the negative electrode current collector lead 7 is not pinched between the lower end of the insulator 11 and the lid 3.

The insulating plate 5 of a high rigidity comes into surface contact with almost the entire region of the upper surface of the electrode body 2 even if an impact is exerted in the longitudinal direction of the battery. Therefore, the electrode body 2 is neither dented nor deformed by the impact of the drop, and this therefore reduces the possibility of the occurrence of short circuit between the positive pole and the negative pole due to the deformation of the electrode body 2. The front and rear sidewalls 25 and 26 of the insulator 11 can swing forward and backward with respect to the lid side insulating portion 22. Therefore, even if the front-and-back dimension of the battery can 1 is increased by a design change, the occurrence of spaces between the front and rear sidewalls 25 and 26 and the front and the rear walls of the battery can 1 can be prevented by widening the interval between the front and rear sidewalls 25 and 26.

Second Embodiment

Figure 6:
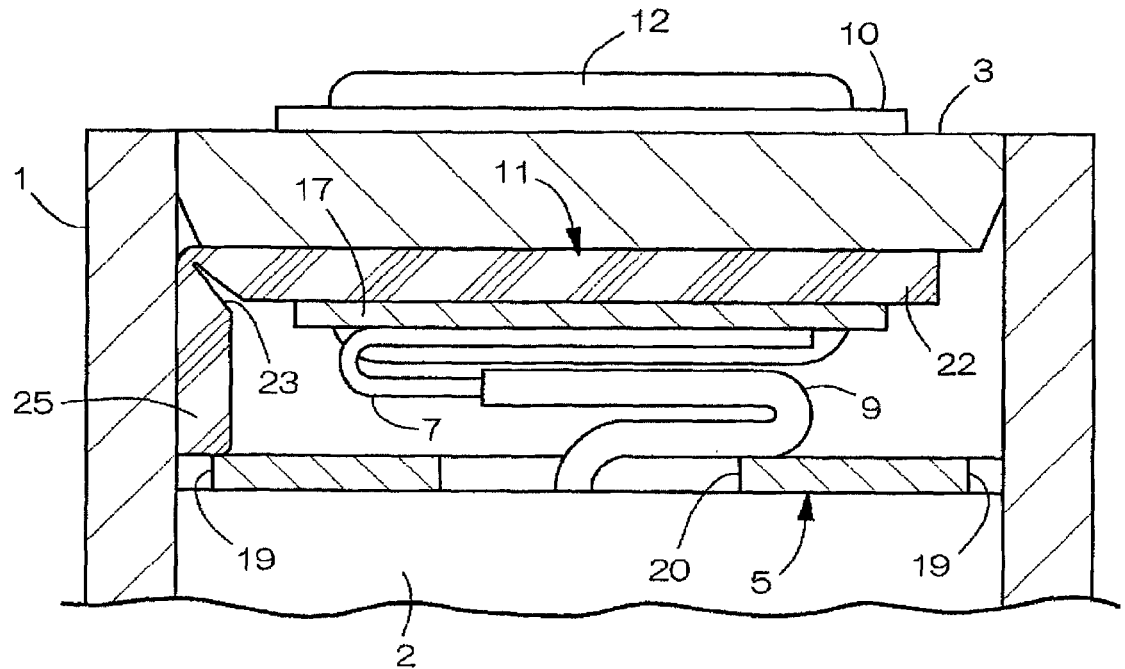
FIG. 6 is a longitudinal sectional side view of the sealed prismatic battery of a second embodiment.

In the second embodiment, as shown in FIG. 6, the rear wall 26 is removed from the insulating plate 11 of the first embodiment. That is, when the negative electrode current collector lead 7 is welded to the lead plate 17 in a surface contact state and then the lid 3 is fit into the battery can 1 after the welding, the exposed portion at the upper end portion of the negative electrode current collector lead 7 is bent at a position located rather closer to the front wall of the battery can 1. Therefore, the front wall 25 of the insulating plate 11 is needed to prevent the short circuit between the exposed portion of the negative electrode current collector lead 7 and the front wall inner surface of the battery can 1.

On the other hand, the lower portion of the negative electrode current collector lead 7, which is covered with the insulating tape 9, is therefore not short-circuited with the inner surface of the rear wall of the battery can 1 even if brought in contact with the surface. Therefore, the rear wall 26 of the insulating plate 11 can be removed. Since the other structures are the same as those of the first embodiment, no description is provided therefor.

Third Embodiment

Figure 7:
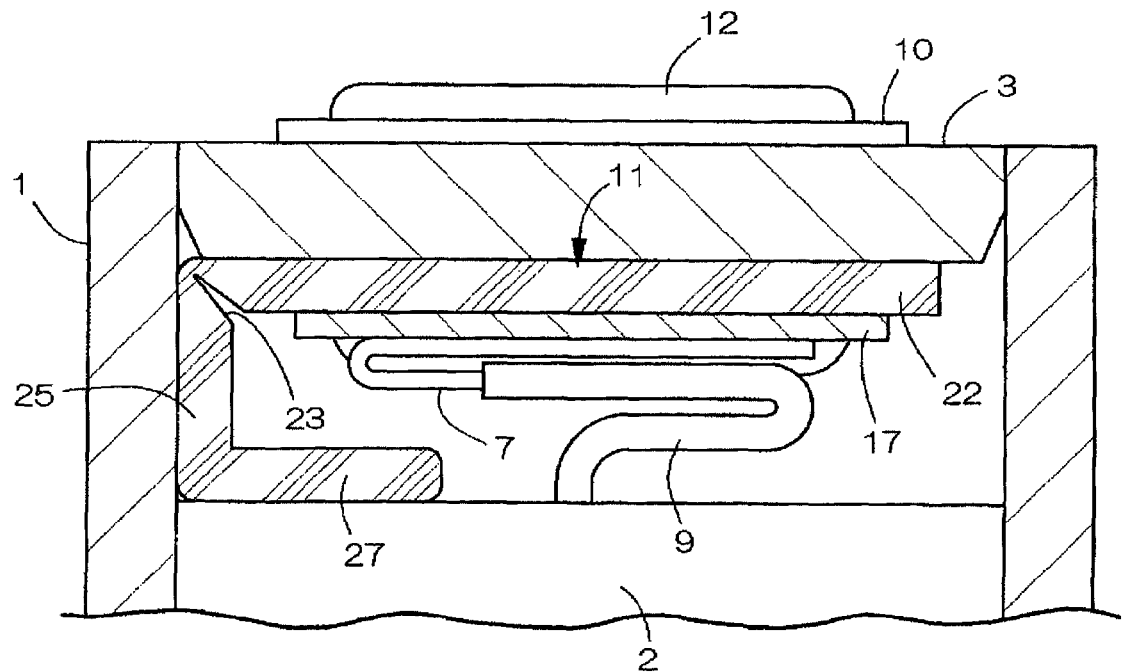
FIG. 7 is a longitudinal sectional side view of the sealed prismatic battery of a third embodiment.

In the third embodiment, as shown in FIG. 7, the rear wall 26 is removed from the insulator 11 of the first embodiment, and a plate-shaped electrode side insulating portion 27 that extends from the lower end of the front wall 25 of the insulating plate 11 toward the center in the front-and-back direction of the battery is provided in place of the insulating plate 5. The electrode side insulating portion 27 pushes the upper surface of the electrode body 2 and reduces the shaking of the electrode body 2 in the battery can 1. Since the other structures are the same as those of the first embodiment, no description is provided therefor.

Fourth Embodiment

Figure 8:
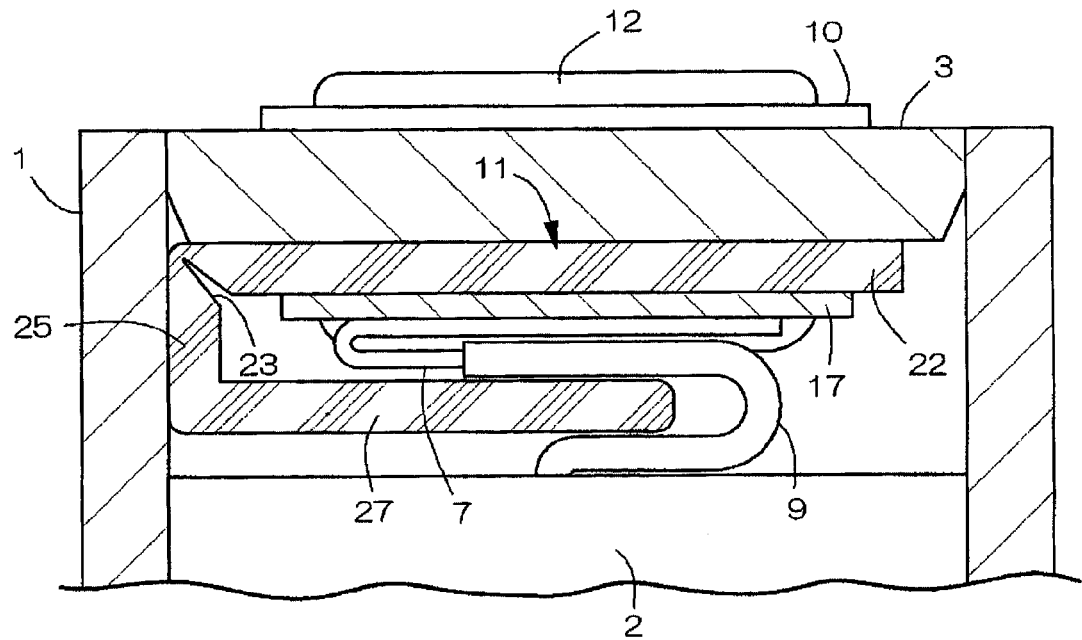
FIG. 8 is a longitudinal sectional side view of the sealed prismatic battery of a fourth embodiment.

In the fourth embodiment, as shown in FIG. 8, the electrode side insulating portion 27 of the insulator 11 of the third embodiment extends longer toward the center in the front-and-back direction of the battery than in the third embodiment. In the fourth embodiment, the shaking of the electrode body 2 in the battery can be reduced by the electrode side insulating portion 27. Besides, in fitting the lid 3 into the battery can 1, the electrode side insulating portion 27 guides the bending of the negative electrode current collector lead 7 by backwardly pushing the lower portion of the negative electrode current collector lead 7. That is, the negative electrode current collector lead 7 is prevented from being bent in a distorted state and consequently being cut. Since the other structures are the same as those of the first embodiment, no description is provided therefor.

Fifth Embodiment

Figure 9:
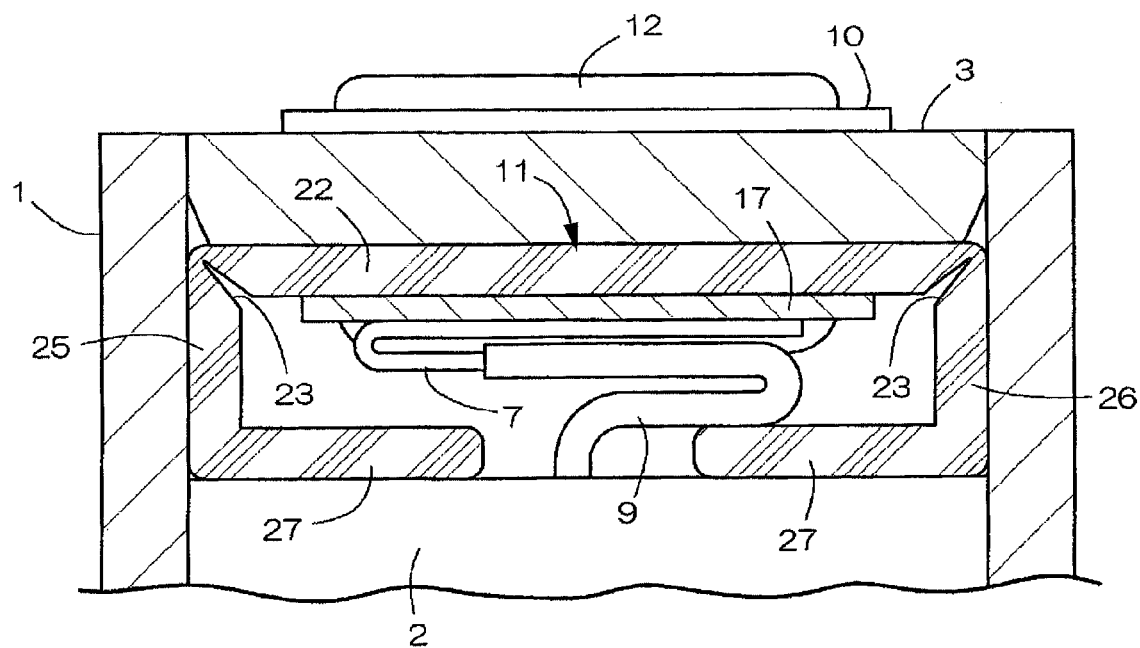
FIG. 9 is a longitudinal sectional side view of the sealed prismatic battery of a fifth embodiment.

In the fifth embodiment, as shown in FIG. 9, electrode side insulating portions 27 and 27 that extend toward the center in the front-and-back direction of the battery are provided at the lower ends of the front and rear sidewalls 25 and 26 of the insulating plate 11 in place of the insulating plate 5 of the first embodiment. In the fifth embodiment, the electrode side insulating portions 27 and 27 are provided at the front and the rear. Therefore, the upper surface of the electrode, body 2 can be more firmly pushed, so that the shaking of the electrode body 2 in the battery can 1 are further reduced. Since the other structures are the same as those of the first embodiment, no description is provided therefor.

Sixth Embodiment

Figure 10:
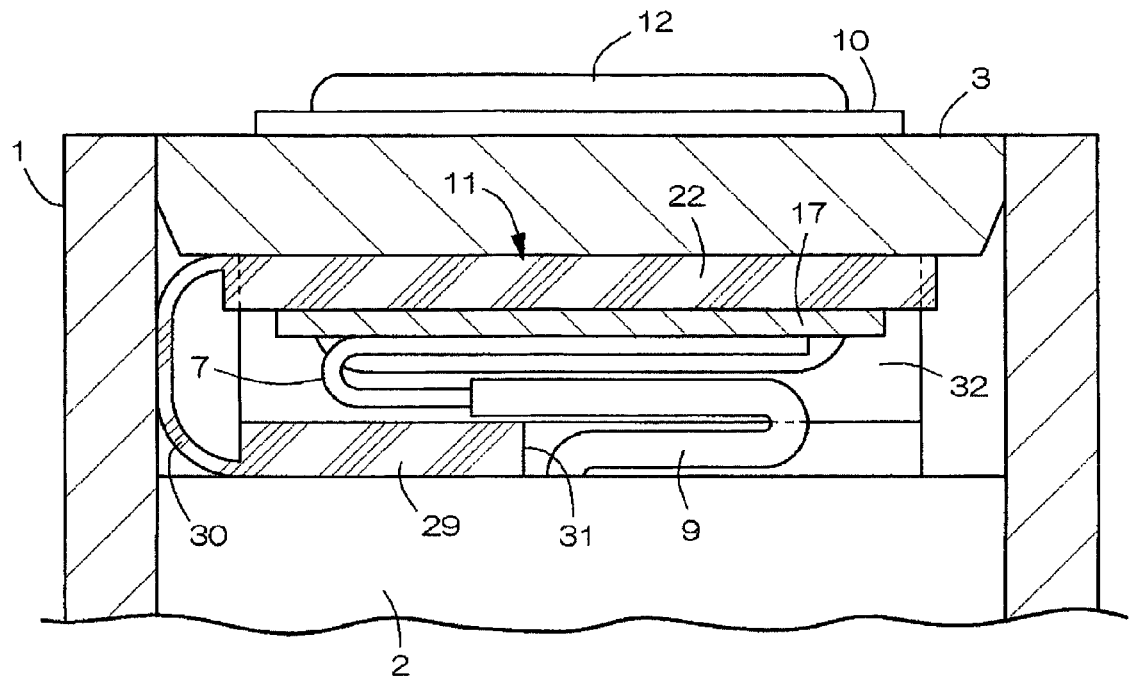
FIG. 10 is a sectional view taken along the line C-C of FIG. 11.
Figure 11:
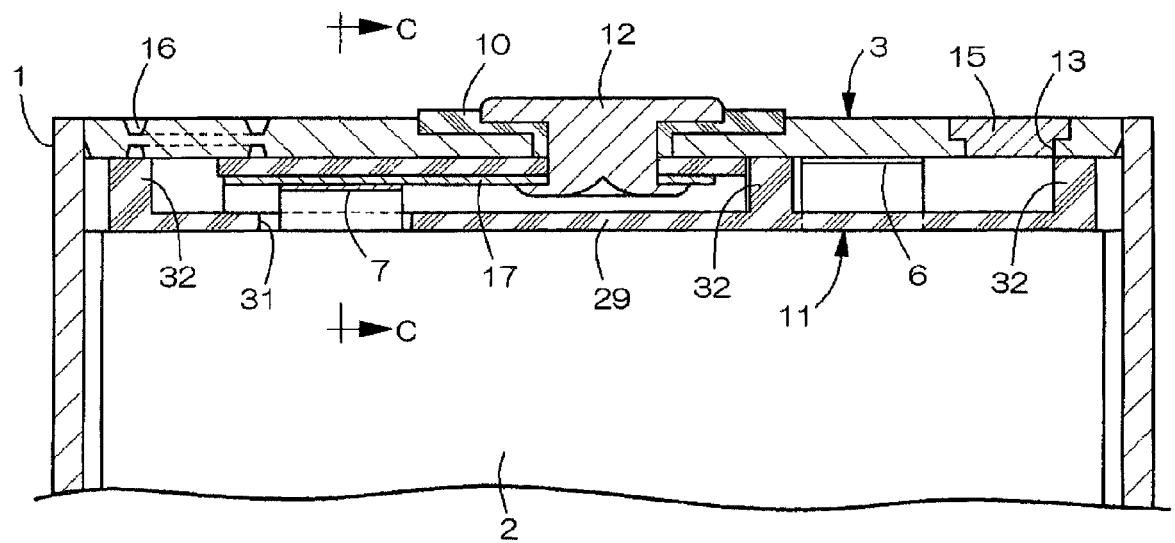
FIG. 11 is a longitudinal sectional front view of the sealed prismatic battery of a sixth embodiment.
Figure 12:
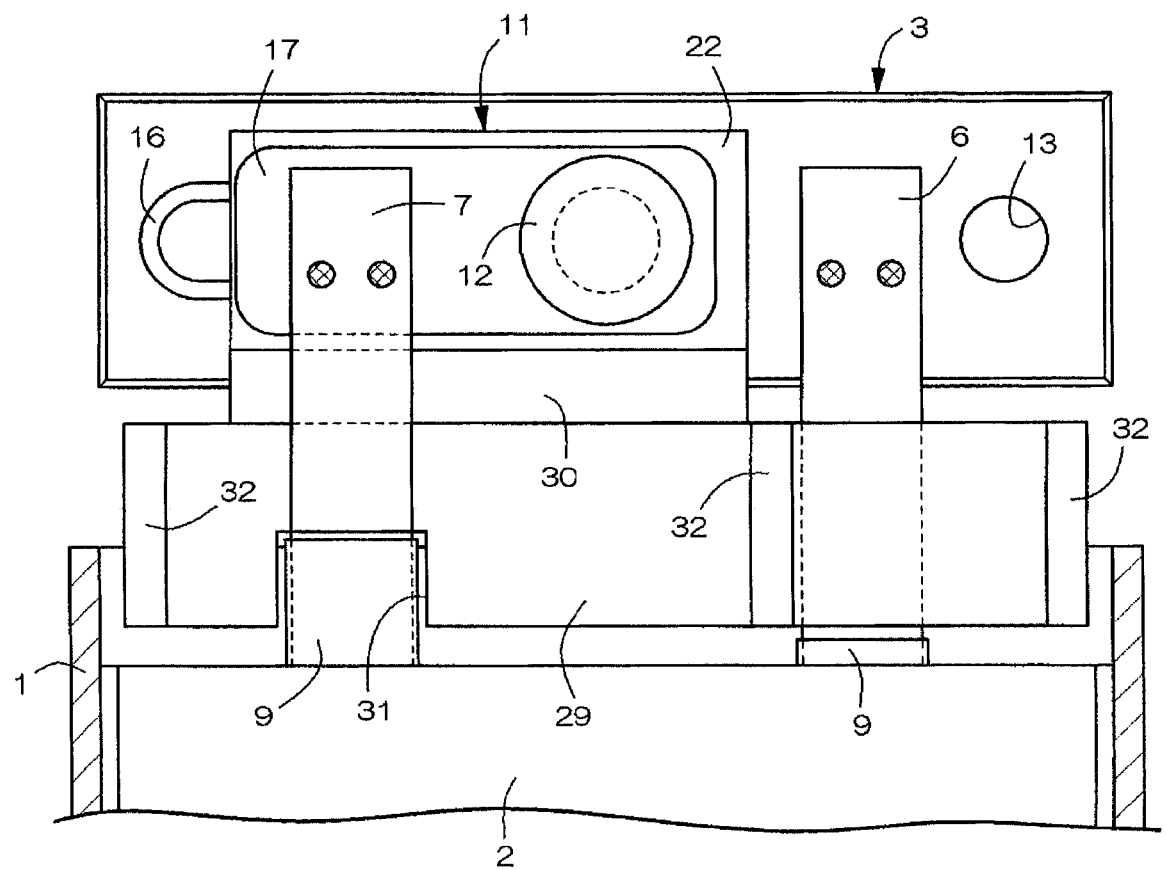
FIG. 12 is a longitudinal sectional front view showing an assembling stage of the sealed prismatic battery of the sixth embodiment.

In the sixth embodiment, as shown in FIGS. 10 through 12, the insulating plate 11 includes a lid side insulating portion 22 held between the lid 3 and the lead plate 17, an electrode side insulating portion 29 placed on the upper side of the electrode body 2 and a thin plate portion 30 that has a flexibility and connects the lid side insulating portion 22 with the electrode side insulating portion 29.

As shown in FIGS. 11 and 12, the electrode side insulating portion 29 has a cut portion 31 through which the negative electrode current collector lead 7 is guided and led to the lead plate 17 and three projections 32 that upwardly project from both right and left ends and an almost center portion in the lateral direction of the upper surface of the electrode side insulating portion 29. The lower portion of the negative electrode current collector lead 7 and the lower portion of the positive electrode current collector lead 6 are each covered with the insulating tape 9. Since the other structures are the same as those of the first embodiment, no description is provided therefor.

When the lid 3 is fit into the battery can 1, the upper ends of the projections 32 abut against the back surface of the lid 3 as shown in FIG. 11, securing a space between the lead plate 17 and the electrode side insulating portion 29. The negative electrode current collector lead 7 is accommodated in the space. The electrode side insulating portion 29 of the insulating plate 11 is brought in surface contact with almost the entire region of the upper surface of the electrode body 2 in the sixth embodiment as in the case of the insulating plate 5 of the first embodiment. Therefore, the electrode body 2 is neither dented by being partially strongly pressurized nor deformed by the impact of the drop or the like.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A sealed prismatic battery having a closed-bottom prismatic tubular battery can that has an opening at its upper surface, a lid that closes the upper surface of the opening of the battery can, an electrode body accommodated in the battery can, an output terminal penetratively fastened to the lid, an insulator that is placed on a lower surface side of the lid and insulates the output terminal at least from the lower surface of the lid, a plate-shaped lead plate that is placed on a lower surface side of the insulator and connected to a lower end of the output terminal, and a thin-plate-shaped current collector lead led upwardly of the electrode body, the current collector lead having an upper end portion welded to a lower surface of the lead plate in a surface contact state and the current collector lead being bent at least in a position located rather closer to a front wall of the battery can, wherein the insulator comprises: a lid side insulating portion held between the lid and the lead plate; an electrode side insulating portion that is placed on an upper side of the electrode body; and a thin plate portion that has a flexibility and connects the lid side insulating portion with the electrode side insulating portion, and the insulator is located closer to a front wall of the battery can than the current collector lead, and the electrode side insulating portion has a projection that upwardly projects on its upper surface.

* * * * *